US007159317B1

(12) United States Patent
Elder

(10) Patent No.: US 7,159,317 B1
(45) Date of Patent: Jan. 9, 2007

(54) INNER METAL LINK BUSHING FOR A VIBRATION ISOLATOR AND METHOD FOR FORMING

(75) Inventor: Christopher A. Elder, Weston, OH (US)

(73) Assignee: K.D.L. Industries LLC, Bowling Green, OH (US)

( * ) Notice: Subject to any disclaimer, the term of this patent is extended or adjusted under 35 U.S.C. 154(b) by 0 days.

(21) Appl. No.: 10/860,547

(22) Filed: Jun. 3, 2004

Related U.S. Application Data

(60) Provisional application No. 60/475,855, filed on Jun. 4, 2003.

(51) Int. Cl.
*B21B 1/46* (2006.01)

(52) U.S. Cl. .............................. 29/898.057; 29/527.4; 29/527.2

(58) Field of Classification Search ........... 29/898.057, 29/898.056, 898.054, 527.4, 527.2; 384/362, 384/215; 138/170; 72/370.14; 383/362, 383/215
See application file for complete search history.

(56) References Cited

U.S. PATENT DOCUMENTS 1,387,199 A * 8/1921 Small ......................... 138/171
1,691,073 A * 11/1928 Klocke .................. 29/898.058
3,537,292 A * 11/1970 Federspill .................... 72/368
4,088,042 A 5/1978 Desjardins et al.
4,139,994 A 2/1979 Alther
4,148,426 A 4/1979 Midzutani et al.
4,328,941 A 5/1982 Phillips et al.
4,460,118 A 7/1984 Ataka et al.
4,570,843 A * 2/1986 Matsuzaki et al. .......... 228/151
4,717,065 A 1/1988 Matsui et al.
4,796,798 A 1/1989 Tsuta et al.
4,971,239 A 11/1990 Tyler et al.
5,002,829 A 3/1991 Shibahara
5,058,269 A 10/1991 May
5,216,811 A * 6/1993 Jackson et al. ........ 29/898.056
5,402,928 A 4/1995 Preston et al.
5,435,516 A 7/1995 Ogasawara et al.
5,543,470 A 8/1996 Nakata et al.
5,769,380 A 6/1998 Hibi et al.
6,145,821 A 11/2000 Suzuki et al.
6,250,615 B1 6/2001 Leibach
6,543,741 B1 4/2003 Li et al.
6,585,222 B1 7/2003 Ihara et al.
6,595,483 B1 7/2003 Cunningham

* cited by examiner

*Primary Examiner*—John C. Hong
(74) *Attorney, Agent, or Firm*—Emch, Schaffer, Schaub & Porcello Co., L.P.A.

(57) ABSTRACT

An inner metal link bushing is formed by providing flat steel stock having a chamfered edge disposed at an angle relative to the surfaces such that, when the flat stock is reshaped to a tubular formation, the edges forming a longitudinal seam will initially contact one another at the outer surfaces thereof leaving slight gap between such edges in the area adjacent the inner surface. The tubular formation is placed in a die having a rigid interior wall surface in close relationship with the outer surface of the tubular formation and a mandrel is positioned inside the tubular formation in slightly spaced relationship therewith. Presses impose compressive forces on the opposing ends of the tubular formation sufficient to squeeze the ends of the tubular formation toward one another and to cause the inner and outer surfaces of the tubular formation to be homogeneously plastically deformed into firm contact respectively with the inner surface of the partible die and the outer surface of the mandrel. The reshaping caused by such compressive forces also forces the edges into sealing engagement with one another.

6 Claims, 6 Drawing Sheets

50 55 52 40 38 38 57 34 56 54 32 52 56

40A 50 56 54 S 52 56

64
RUBBER
66
40A
R
68
60A
60B
S
62

64
RUBBER
66
60A
60B
40A
S

70
R
40A
S
72

INNER METAL LINK BUSHING FOR A VIBRATION ISOLATOR AND METHOD FOR FORMING

CROSS REFERENCE TO RELATED APPLICATION

This application is based upon and claims the benefit of U.S. Provisional Application No. 60/475,855 filed Jun. 4, 2003.

BACKGROUND OF THE INVENTION

Currently there are two common ways to manufacture rubber vibration isolators. Each involves a steel tube or inner metal link bushing surrounded by vulcanized rubber. The steel tube gives the isolator rigidity and provides the means to attach the device. The first method, method A, utilizes a preformed and cured rubber piece. The metal link bushing is coated with a rubber adhesive and pressed into the rubber piece. The adhesion sometimes breaks down and tends to separate the bushing from the rubber. The second and preferred method of manufacturing, method B, places the adhesive coated metal link bushing inside of a mold. The rubber is injected under pressure into the mold and the vibration isolator is cured as one unit. The benefit of this technology, method B, is the bond between the bushing and the rubber is much stronger than under method A. Under method B, the rubber will typically tear before the adhesive gives way.

Each of these methods uses a different raw product for the bushing. Method A uses a flat steel stock which, as described below, is progressively formed into a tube. Heretofore, method B has used "drawn over mandrel" (DOM) tubing or welded seam tubing. The raw material cost for DOM tubing is roughly 3–4 times that of flat stock used in forming tubing. The main reason for not heretofore using tubing formed from flat stock for method B, under which rubber is injection molded around tubing positioned in a mold, is seepage of rubber through the seam of the tubing due to the high pressure. Removing this material after curing is troublesome and not cost effective.

SUMMARY OF THE INVENTION

The present invention permits the use of flat metal stock for forming tubing to be used as a metal link bushing in manufacturing a vibration isolator using the feature of method B of injection molding rubber around the tubing and to do so without seepage of rubber into the interior of such tubular bushing. As a result, it permits the manufacture of a vibration isolator at a cost which is significantly lower than the cost of manufacturing one using DOM tubing according to method B but has the benefits of method B with the strong bond between the injection molded rubber and the metal tubing.

According to the present invention, a vibration isolator is formed by providing a substantially flat metal sheet which is deformed by a progressive die or other suitable equipment into a tubular formation. The flat metal sheet is provided with edges which, upon forming to a tubular formation, adjoin one another. The edges are tapered at an angle such that, upon the forming to form the tubular formation, the portions of such edges adjacent the outer surface of the tubular formation will come into contact with one another but portions of the opposing edges adjacent the inner surface of the tubular formation will be spaced from one another leaving an inwardly facing longitudinal gap in the tubular formation. The tubular formation is then positioned in a die having a rigid interior wall in close proximity or contact with the outer surface of the tubular formation. A mandrel is positioned in the interior of the tubular formation. While the tubular formation is thus positioned in the die, presses engage opposing ends of the tubular formation and apply compressive forces, on the order of 40 tons or more, to force the ends closer to one another and thereby causing the tubular formation to deform inwardly into conformity with the mandrel, expand into tight engagement with the rigid wall of the die and cause the edges to deform into firm contact with each other thereby closing the gaps. The compressive force is sufficiently high to cause the steel to flow and form a seal at such edges sufficiently tight to resist any inflow of rubber during injection molding of the rubber. Such cold flow of the steel is believed to create an intermolecular bond between the opposing edges to form such seal.

DETAILED DESCRIPTION OF THE PREFERRED EMBODIMENT

Figure 1:
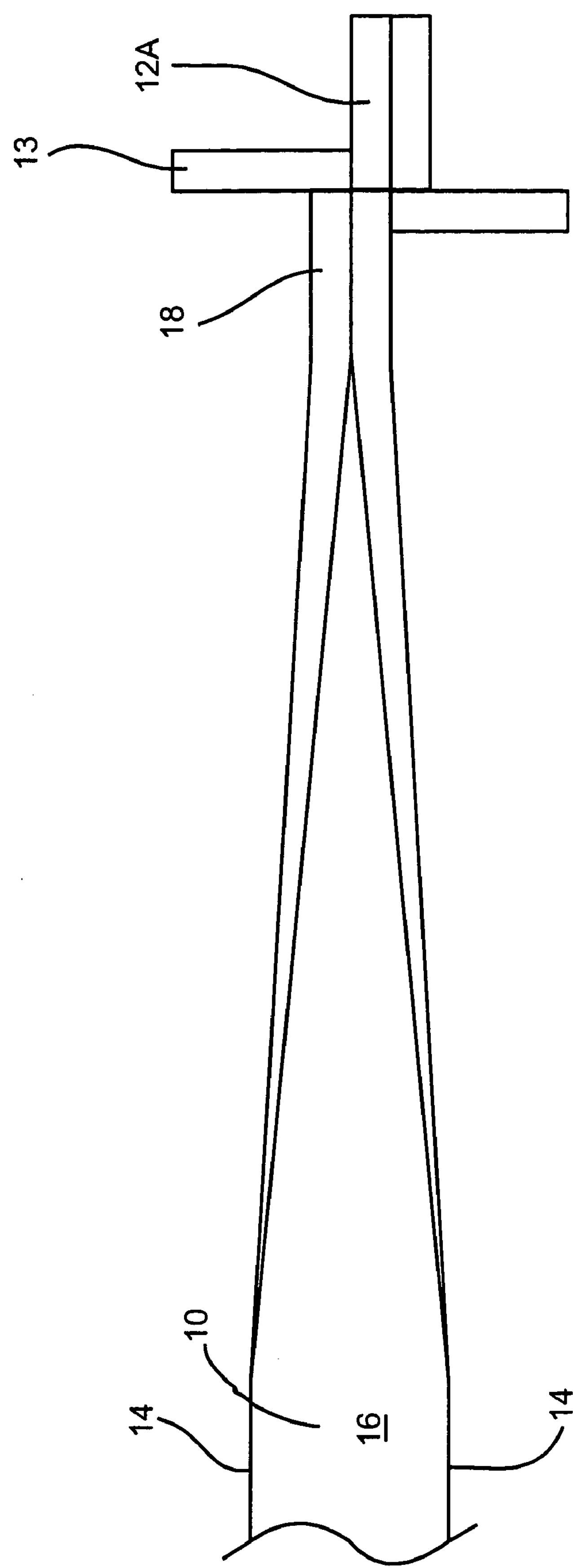
FIG. 1 is a schematic view showing reshaping flat steel stock with a progressive die to form a tubular formation.

The steel tubes utilized in method A are made from flat stock material 10 fed through a progressive die set. This process cuts the flat stock to length and through a series of progressions, forms a tube like product as shown in FIG. 1. The end product or tube 12 retains a minimum of 50% seam closure with a visible gap on the outer diameter. This is a result of squared edges disposed at 90 degrees to the upper and lower surfaces of the flat stock material 10 and the fact that during the final progressions, the material edges are forced to flow from the inner diameter out. In an open die set localized work hardening stalls the material flow toward the outer diameter. This prevents full closure of the seam thereby providing a gap 22 between the edges 14 at the outer surface and a means for the rubber to breach the interior of the tube 12 during injection of the rubber according to method B as will be discussed in greater detail with reference to FIGS. 2A and 2B. Additionally, the outer diameter surface condition is heavily marked from multiple striking and inconsistent in form and appearance. Residual stress is an additional side effect of progressive striking or forming. Localized regions of stress within the steel will result in movement of such steel when it is exposed to dynamic or thermal stress as is encountered by injection molding rubber therearound under method B. Such movement also contributes to the inability to obtain a leak-proof seal at the joined edges 14 thereby allowing rubber to seep through the seam The process of the present invention allows the cost effective production of a bushing and vibration isolator in which the tubular formation for the bushing can be formed from flat stock fed through a progressive die set while permitting the injection molding of rubber therearound as described with reference to method B without encountering seepage of rubber into the interior. Furthermore, all product sizes will meet the process requirements of method B.

The process, features and advantages of the present invention include the following:

1. Coiled steel is slit to the required width to form a sheet of flat stock for a product family.
   - Processing from mother coils lowers raw material cost.
   - Material wall thickness of the tubular formation is approximately 75% of final product.
2. Slit coils are processed through a roll former producing a continuous tubular formation.
   - Roll forming process reduces local stress regions.
   - High volume/low maintenance.
3. A 25 degree angle chamfer is formed on edges.
4. Tubular formation is cut to length in a flying shear.
   - High volume and accuracy.
5. The respective tubular formations are inserted in a die set with a mandrel positioned in the tubular formation and then cold formed from each end simultaneously with compression members applying compressive loads in the range of 40 tons.
   - Eliminates the necessity of costly phosphate coated materials typically found in cold heading processes.
   - Produces a part with uniform and homogeneous plastic deformation.
   - Material flows from the outer diameter inward.
   - Near seamless appearance with exceptional resistance to breach by injection molded rubber.
6. Formed tubes are machined to final length and deburred.
   - Minimal material loss.
   - Squares the end faces to protect against extruded rubber seepage or flashing.

As used herein, the term "tubular formation" means the product exiting the progressive die set before or after cutting to the desired length but before being subjected to the compressive forces forming the tube with a leak-proof seam.

Detailed Part Process

Steps 1, 2, 3 and 4 of the above process provide a rough dimensioned tubular formation suitable for forming a part conforming to the desired specifications. Each edge of the flat stock is shaped with a chamfer of 25 degrees plus or minus 10 degrees, such that the edges which abut one another following passing through the progressive die set will make contact with the opposing edge in the area adjacent the outer surface of the tubular formation. The tubular formation is formed in one continuous operation and cut to length. The application of compressive forces to the ends of such tubular formation when positioned in a die with a mandrel inside the tubular formation creates a smooth outer surface on the finished tube. This alleviates the problem of material being pushed through the seam during injection molding of rubber in method B processing.

The cold forming or pressing operation is based on the weight/mass of the finished tube. Forming is done by a dual action cold forming process. The rough sized tubular formation is placed into a die, FIGS. 5A and 5B, to hold the outer diameter to the tolerances necessary. A mandrel is placed through the tubular formation to create the inside dimension of the finished tube. Applying compressive force on both ends of the tubular formation causes the steel flow into the void spaces between the tubular formation and (1) the die and (2) the mandrel and to fill in gaps between the joined edges. It also shortens the length such that the length of the finished tube is within 0.005" of the specified length. Carbide milling heads may be used to trim the tube to size.

Figure 2A:
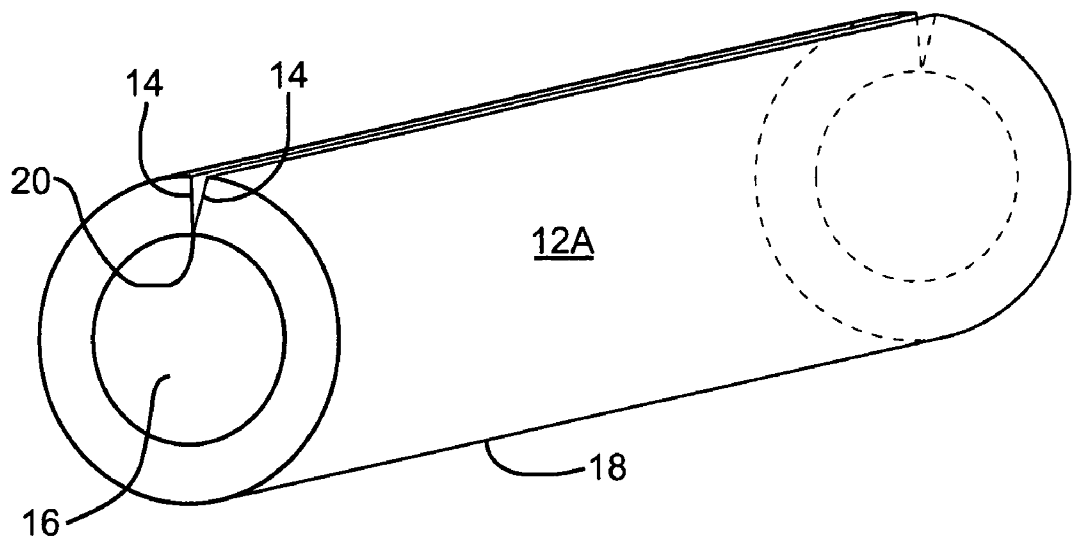
FIG. 2A is a perspective view of a partially formed length of tubing at an area within the progressive die following initial contact of opposing edges in a prior art process.
Figure 2B:
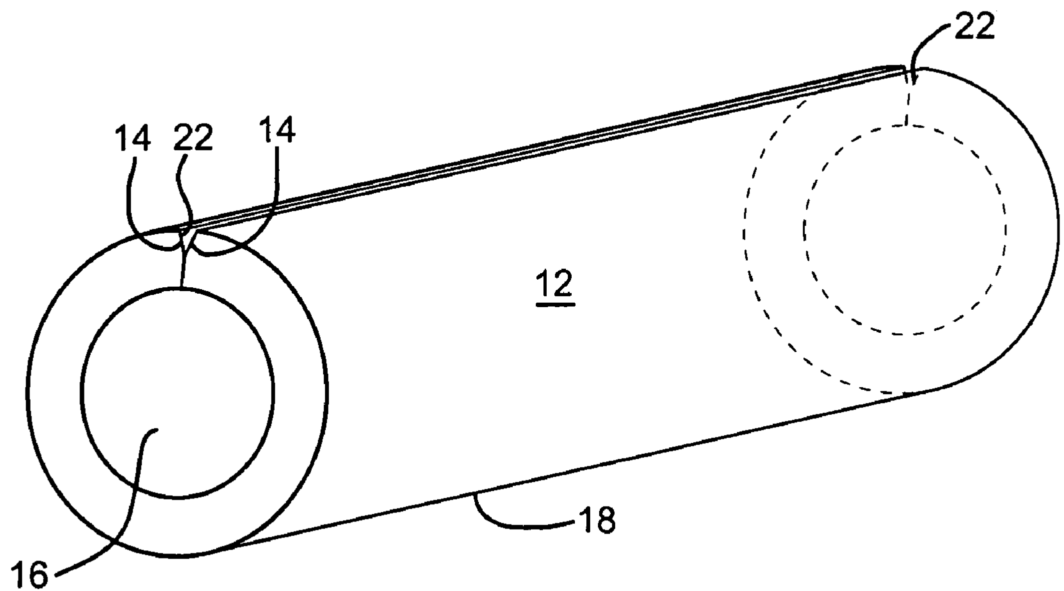
FIG. 2B is a view similar to FIG. 2A showing a length of tubing formed in the prior art process following its exit from a progressive die.

Referring to FIGS. 1, 2A and 2B, there is shown forming a blank of flat stock steel 10 by means of a progressive die into a tubular shape which can be trimmed by a cutter 13 to form a tubular formation 12A of desired length. The flat stock 10 of the prior art had edges 14 which were perpendicular to the opposing sides or surfaces 16, 18 of the sheet 10. FIG. 2A shows schematically the positioning of the edges 14 of a section of nearly formed tubing at the area of the progressive die when the opposing edges 14, 14 initially come into contact with one another. As can be seen in FIG. 2A, since the edges 14, 14 of the original flat blank 10 were cut at 90° to the flat surface 16 intended to become the inner surface and the opposing surface intended to become the outer surface 18 of the partially formed tubular formation 12A, the edges 14, 14 will initially contact one another at an interior line of contact 20 at the inner surface 16. As the partially formed length of tubing (tubular formation 12A) continues to be processed, the edges 14, 14 are squeezed together resulting in a squeezing together initially at the interior surface 16 and flowing outwardly. However, as the length of tubing 12 exits the progressive die, there will remain a gap 22 between the edges 14,14 at the outer surface 18. As previously discussed, when a length of tubing 12 such as that shown in FIG. 2B is utilized as an inner metal link bushing according to method B previously described in which rubber is injected under pressure into a mold containing such metal link bushing, the rubber will seep through the gap 22 and be forced into the interior surface 16 between the joined edges 14.

Figure 3A:
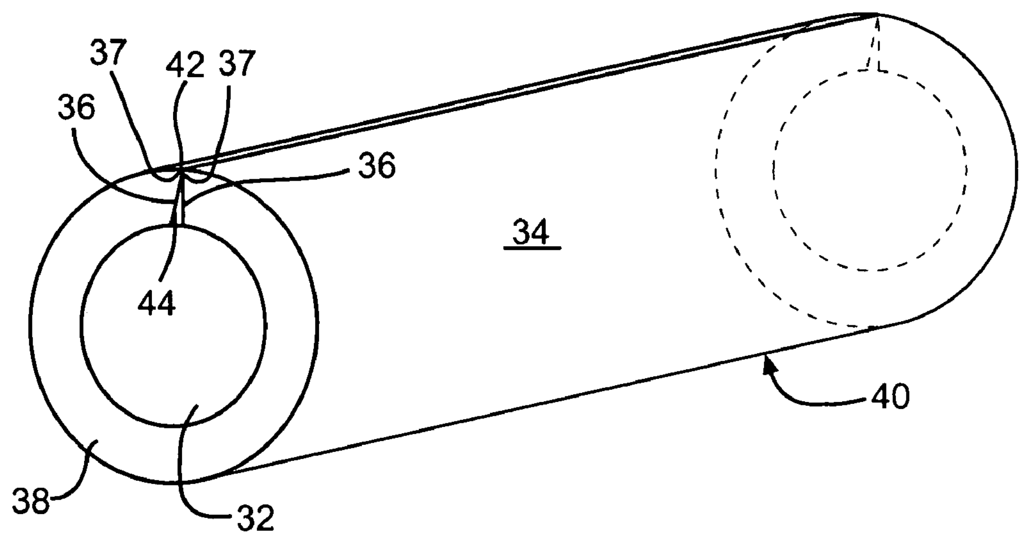
FIG. 3A is a perspective view of a length of tubular formation formed in a progressive die from flat steel stock having tapered edges as shown in FIG. 4 according to the present invention.
Figures 4A, 4B, 4C:
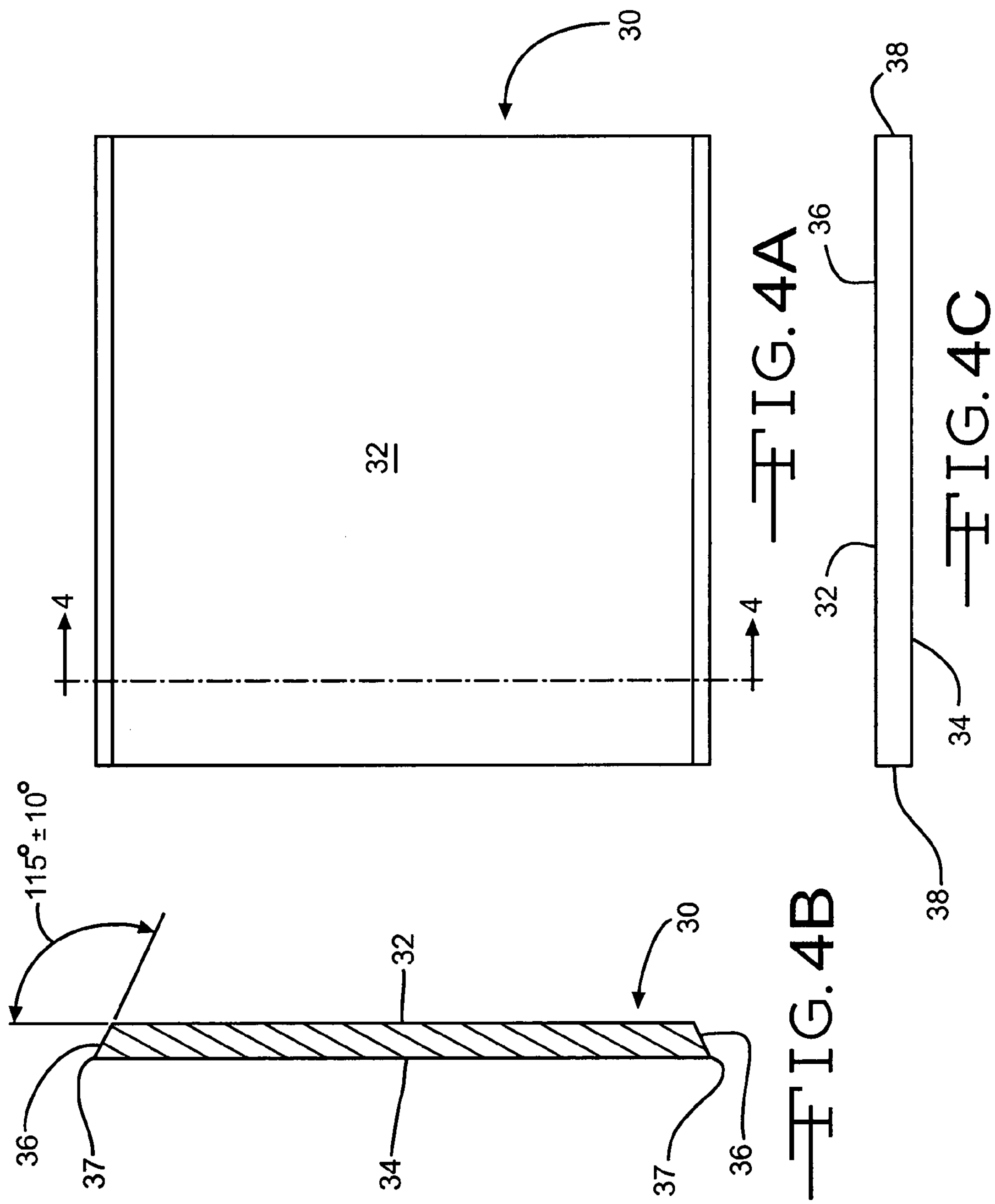
FIG. 4A is a plan view of a blank of steel used for forming a tubular formation according to the present invention.
FIG. 4B is a sectional view taken through line 4—4 of FIG. 4A.
FIG. 4C is a side view of the blank of steel shown in FIG. 4A.

Under the present invention, a blank 30 of steel (see FIGS. 4A, 4B and 4C) having a flat first side 32 intended to form the inner surface of the tubing and a flat second side 34 intended to form the outer surface of the tubing is provided. The blank 30 has side edges 36 which will be joined together following forming in the progressive die or other reshaping mechanism to form a tubular formation 40 as shown in FIG. 3A. The side edges 36 are each disposed at an included angle of 65°±10° to the outer surface 34. This is shown in FIG. 4B as an angle of 115°±10° to the extended planes of the first side 32 and edges 36. Each of the edges 36 forms a line of juncture 37 with the second side 34. Third and fourth edges 38, 38 intended to become the ends of the length of the tubular formation 40 and the formed tubing extend between the angled edges 36 and are disposed at right angles to the first and second sides 32 and 34.

Referring to FIG. 3A, there is shown a length of tubular formation 40 as trimmed following its exit from the progressive die or other reshaping mechanism. The lines of juncture 37 of the respective tapered edges 36 are shown as having made contact with one another along a line of contact 42 at the outer surface 34 but are also shown as having a gap 44 along the inner surface 32.

Figure 3B:
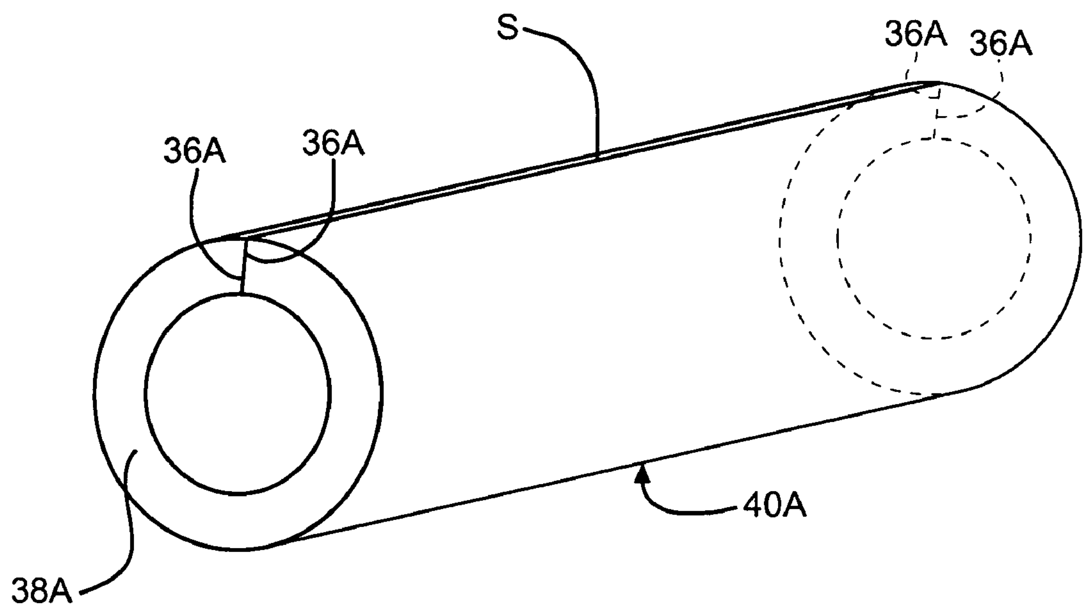
FIG. 3B is a view similar to FIG. 3A showing a length of tubular formation formed according to the present invention following further processing as described with reference to FIGS. 5A and 5B to form a metal link bushing.
Figure 5A:
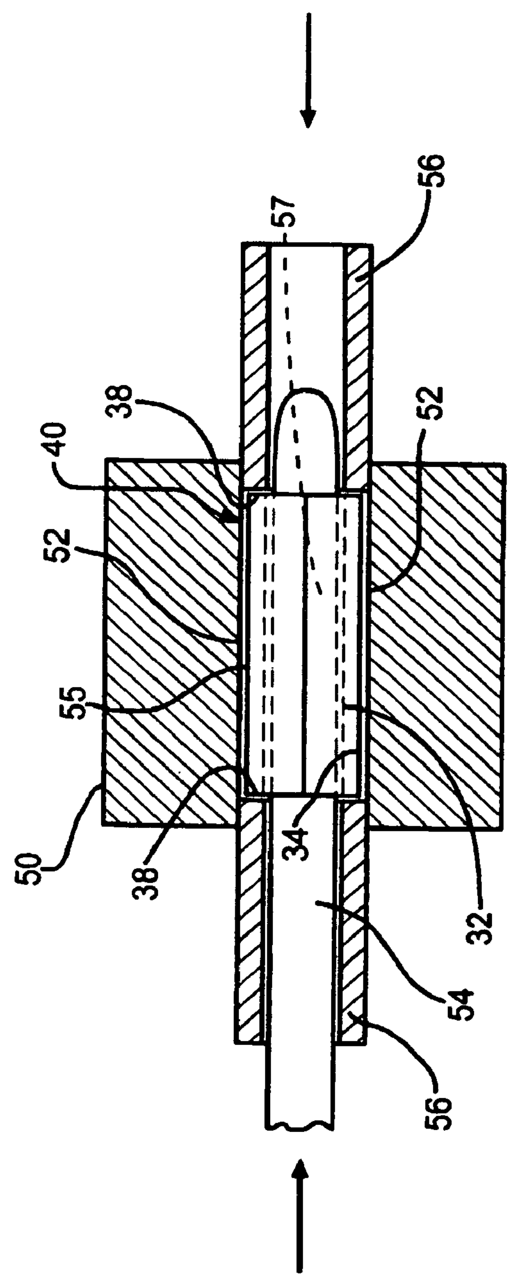
FIGS. 5A and 5B are schematic views in section showing the further processing of a length of tubular formation of FIG. 3A to form a metal link bushing as shown in FIG. 3B.
Figure 5B:
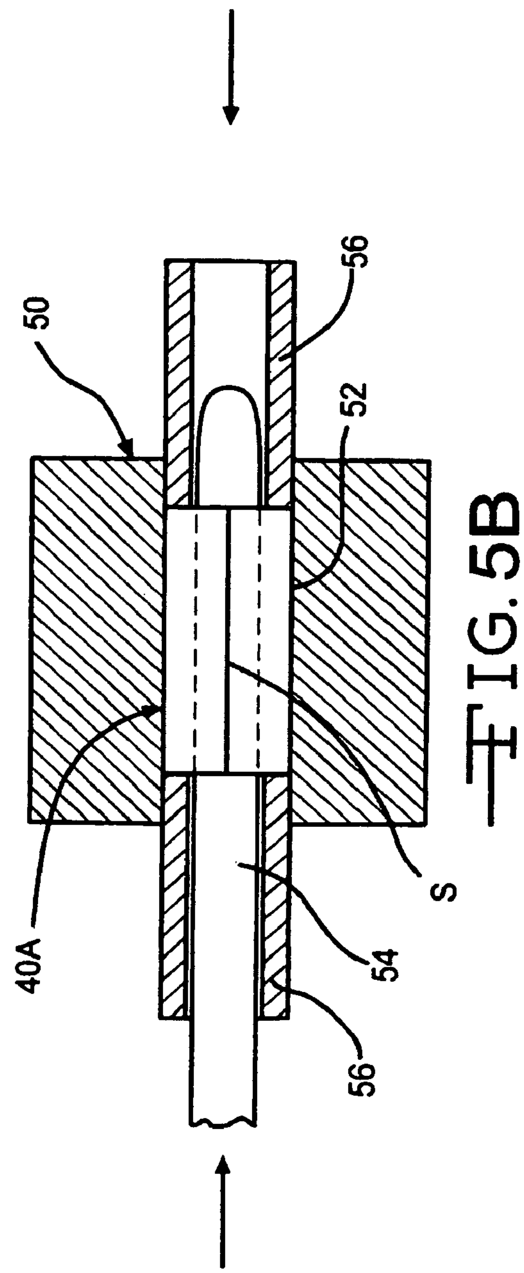

FIG. 3B shows the finished length of tubing 40A after processing as shown in FIGS. 5A and 5B with the edges 36A engaged to one another throughout their complete surface areas. The tubing 40A is suitable for use as an inner metal link bushing.

As shown in FIGS. 5A and 5B, the tubular formation 40 is enclosed within the sections of a partible die 50, with the inner surface 52 of each die section being rigid and slightly spaced from the outer surface 34 forming a gap 55. The gap 55 is quite small, being only large enough to accommodate irregularities at the outer surface 34 to permit the sections of the partible die 50 to close therearound. A mandrel 54 is positioned in the tubular formation 40 in spaced relationship with the inner surface 32 leaving a gap 57. First and second punches 56, each of which is substantially equal in size to the size of the ends 38 of the tubular formation 40, are engaged to the opposing ends 38 of the tubular formation 40. A compressive force on the order of 40 tons or more is applied to the punches 56 and by the punches 56 to the ends 38 to thereby force the ends 38 closer to one another and thereby causing the steel of tubular formation 40 to flow into the gap 55 between the outer surface 34 and inner surfaces 52 of the partible die 50 and into the gap 57 between the inner surface 32 and the mandrel 54. The steel will flow inwardly to a greater extent than outwardly as the gap 57 is wider than the gap 55. Such flowing of the steel under the high compressive forces also causes the opposing edges 36 to become firmly joined together throughout their length and breadth as joined edges 36A as shown in FIG. 3B forming a tube 40A defining a metal link bushing with a longitudinal seam S. As will be appreciated, the compressive forces will cause the ends 38A to be closer together than the ends 38 of the tubular formation 40. The compressive force and flowing of the steel form a seam S which is sealed sufficiently tight to resist any inflow of rubber during injection molding of the rubber as previously described according to method B. The compressive force causes the steel to be homogeneously plastically deformed thereby resulting in such leak-proof seal at the seam S.

Figures 6A, 6B, 7:
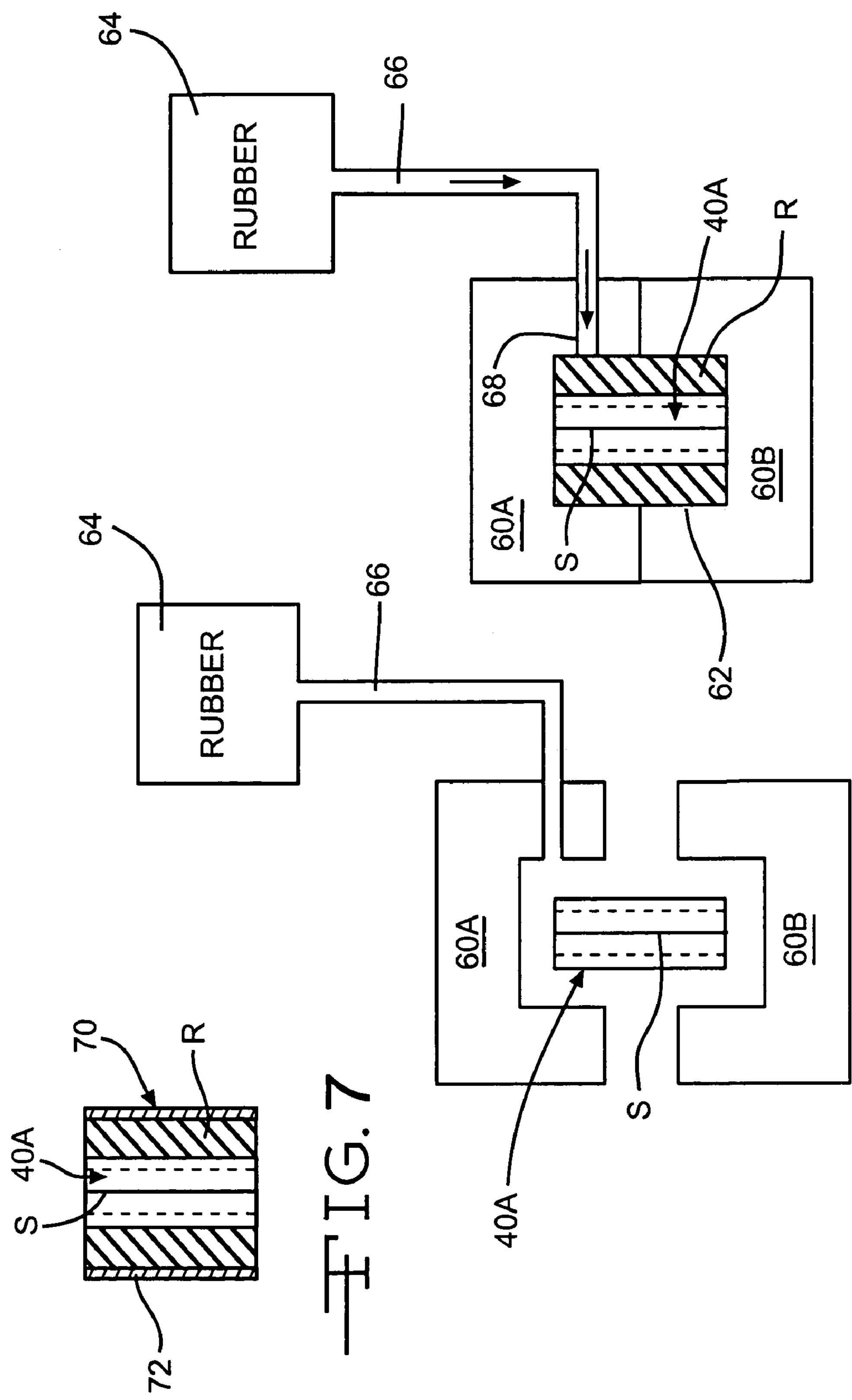
FIGS. 6A and 6B are schematic views showing injection molding rubber around the metal link bushing.
FIG. 7 is a view showing the metal link bushing formed according to the present invention.

Referring to FIGS. 6*a* and 6B, there is shown schematically injection molding of rubber around the tube 40A which was formed in accordance with the present invention with the seam S. The tube 40A is positioned between the open halves 60A and 60B of a partible mold. Following such positioning, the mold halves 60A and 60B are closed around the tube 40A as shown in FIG. 6B. The closed mold halves 60A and 60B define a cavity 62 larger in peripheral size than the tube thereby leaving a space in which rubber may be injection molded.

As is well known in the art, rubber is processed in an extruder 64 and delivered/injected under pressure through a passageway 66 leading to one of the mold halves 60A. As shown in FIG. 6B the mold half 60A is provided with an inlet passageway 68 for receiving the heated rubber from the extruder 64 and its passageway 66 and delivering it to the cavity 62 to thereby form a rubber member R. As shown in FIG. 6B, the rubber encircles the circumferential periphery of the tube 40A in a bonding relationship. However, as a result of the tube 40A being formed in accordance with the present invention, the seam S is sealed sufficiently tight to be able to resist any in-flow of rubber into the interior of the tube 40A during the injection molding operation.

Referring to FIG. 7, there is shown a bushing 70 for use as a component of a vibration isolator. It could be used with a variety of vibration isolators widely available in the art. The bushing 70 comprises (1) the metal tube 40A formed in accordance with the teachings and descriptions of FIGS. 3 through 5A and 5B, and (2) the injection molded rubber member R formed as shown and described with respect to FIGS. 6A and 6B. Additionally, the bushing 70 may have an outer metal layer 72 encircling the rubber member R.

Modifications will be readily apparent to those skilled in the art. Accordingly, the scope of the present invention should be limited only by the scope of the claims appended hereto.

I claim:

1. A method for forming a vibration isolator comprising the steps of (a) providing a flat metal sheet, said metal sheet having first surface and a second surface parallel to said first surface, first and second end edges extending between said first surface and said second surface, a first side edge extending between said first surface and said second surface and extending between said first and second end edges thereby forming a first line of juncture between said second surface and said first side edge, and a second side edge spaced from said first side edge extending between said first surface and said second surface and extending between said first and second end edges thereby forming a second line of juncture between said second surface and said second side edge, each of said first and second side edges being disposed at an angle non-perpendicular to the first and second surfaces such that, upon deformation of said sheet from flat to a tubular formation in which said first surface forms the interior of said tubular formation and said second surface forms the exterior of said tubular formation, said first line of juncture will contact said second line of juncture in the area of said second surface while portions of said first side edge closer to said first surface are spaced apart from opposing portions of said second side edge to thereby form a gap at said interior;

(b) deforming said sheet into a tubular formation with said first surface forming the interior of said tubular formation and said second surface forming the exterior thereof;

(c) encircling said tubular formation in a rigid enclosure;

(d) applying compressive forces axially on said first and second end edges to squeeze said first and second end edges toward on another and expand said tubular formation into contact with said rigid enclosure and deform said spaced apart portions of said first and second side edges into sealing contact with one another to close said gap and form a tube; and (e) injection molding rubber around an exterior circumferential portion of said tube.

2. The method according to claim 1 further including the step of positioning a mandrel into the interior of said tubular formation prior to the step of applying compressive forces, said mandrel and the interior surface of said tubular formation having a space therebetween prior to step (d).

3. The method according to claim 2 further including the step of causing said metal to flow inwardly into contact with said mandrel.

4. The method according to claim 1 wherein the included angle between said second surface and each of said side edges is in the range of 55° to 75°.

5. The method according to claim 1 wherein said metal is steel and further including the step of creating a leak-proof seal between said first and second side edges by homogeneously plastically deforming said steel following contact between said first and second side edges.

6. The method according to claim 1 wherein said rigid enclosure and the exterior surface of said tubular formation have a space therebetween prior to step (d) and further including the step of causing said metal to flow outwardly into contact with said rigid enclosure.

* * * * *